J. A. SMITH.
Axle Lubricator.
No. 651.
Patented March 23, 1838.
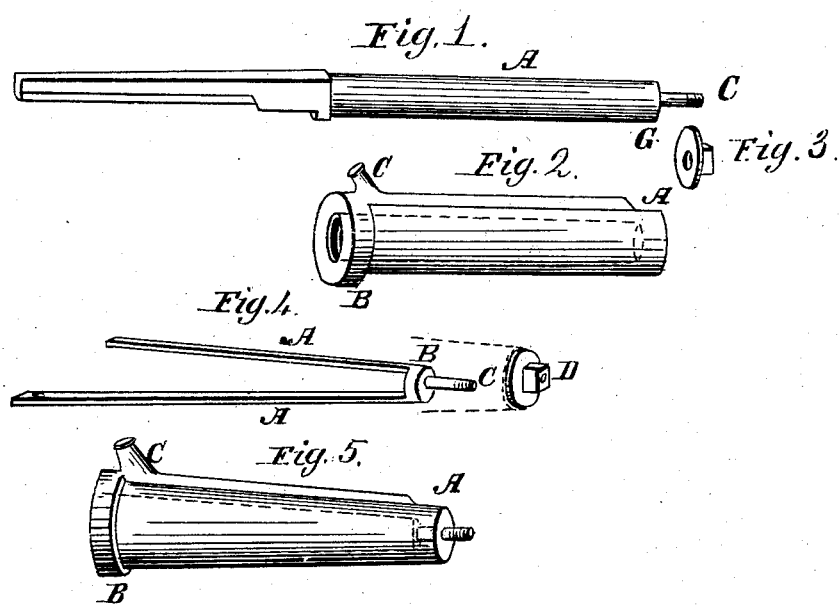

UNITED STATES PATENT OFFICE.

JAMES A. SMITH, OF NEW HAVEN, CONNECTICUT.

BOX AND AXLE FOR CARRIAGES.

Specification of Letters Patent No. 651, dated March 23, 1838.

*To all whom it may concern:*

Be it known that I, JAMES A. SMITH, of New Haven, in the county of New Haven and State of Connecticut, have invented a new and useful Improvement in Boxes and Axles for Carriage-Wheels, the object of which is to lessen friction and to prevent oil from escaping. This I effect by making a friction washer and thereby an oil preserver, a constituent part of the box on the outward end, instead of the common friction washer on the axle at the other end of the box.

This improvement is equally applicable to axles of iron or wood.

To enable others skilled in the art, to make and use my improvement, I more particularly describe its construction and operation as follows.

The box for iron axles is made by casting or otherwise in the usual manner of making pipe boxes—but with a bore of uniform diameter from end to end, excepting, that a lip or shoulder, which I call a friction lip or shoulder, is formed on the inside of the outer washer is formed on the inside of the outer end. This lip or shoulder in boxes for iron axles of a medium size or one and a half inches in diameter, should be about ⅜ of an inch thick and deep leaving a hole for the end of the axle about ¾ of an inch in diameter.

The arm of the iron axle is also of uniform size, and made to fit, and play easily in the bore of the box, with a shoulder to fit the shoulder of the friction washer within the box, the end projecting beyond the box, being armed with a screw thread in usual form to receive a corresponding nut washer.

The box for axles of wood is made with a tapering bore corresponding with the size of the intended axle, and is armed at the outer end with a friction washer, or shoulder as above described.

The arm of the wood axle is made to fit the bore of the box and is armed on the top and bottom with a chain or strap of iron embedded and made fast, terminating at the outward end of the arm with an iron ring or shoulder, to fit the shoulder in the box, on a spindle projecting beyond the box to receive the nut-washer.

Both kinds of boxes may be furnished with an oil-tube rising obliquely from the flange and terminating with a stop screw, between the sand box and the rear band of the hub. Oil tubes may be dispensed with, but if desired, the mode of insertion herein specified is a great improvement on all the modes now used.

For further illustration I refer to the accompanying drawings as part of my specification.

Figure 1, represents an arm of an iron axle, A the shank fitting the box, B, its shoulder to rest against the shoulder of the friction washer in the box, C, its projection beyond the box to receive the nut washer. Fig. 2, the pipe box for an iron axle, the bore designated by dotted lines, A, friction washer or inner lip a constituent part of the box, B sand box in common use, C oil tube with stop screws. Fig. 3, nut washer. Fig. 4, A, A, the iron strap embedded and secured on axles of wood, terminating in the iron shoulder B, on the projecting spindle C, for the nut D. Fig. 5, the box for axles of wood, the bore designated by dotted lines, A friction washer with spindle projecting, B sand box, C oil tube.

The consequence and advantages of this improvement are, that all friction is removed from the usual friction washers on the inner shoulder of the axle (which by setting the axle, usually becomes not parallel with the opposing face of the box) and is transferred to the friction washer in the box, which controls the surge of the carriage both ways and always presents equal and parallel faces for the friction occasioned by it, and at the place where the oil is necessarily retained by the form of the box and the set of the axle, and this retention of oil may be increased by suitable packing with leather on the outer shoulder of the axle.

What I claim as my invention and improvement is—

The friction washer within and making a constituent part of the box and the corresponding shoulder on the axle, as both are above specified and described, and therefore I solicit Letters Patent.

New Haven, Novr. 16th 1837.

JAMES A. SMITH.

Witnesses:
SIMEON BALDWIN,
SILAS MIX.